Figure 1:
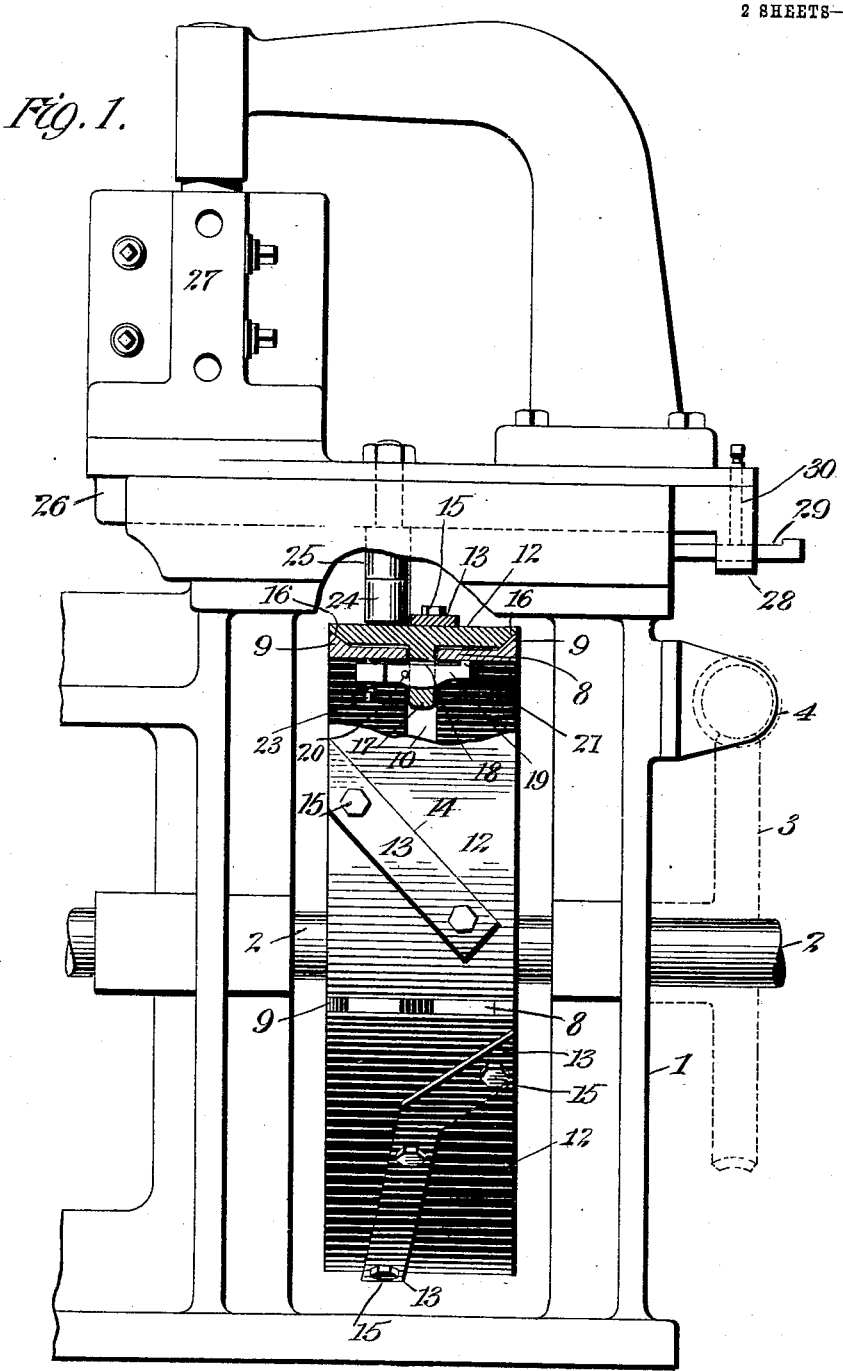

E. TRAUB.
CAM MECHANISM.
APPLICATION FILED DEC. 3, 1907.

977,488.

Patented Dec. 6, 1910.
2 SHEETS—SHEET 1.

E. TRAUB.
CAM MECHANISM.
APPLICATION FILED DEC. 3, 1907.
977,488.
Patented Dec. 6, 1910.
2 SHEETS—SHEET 2.
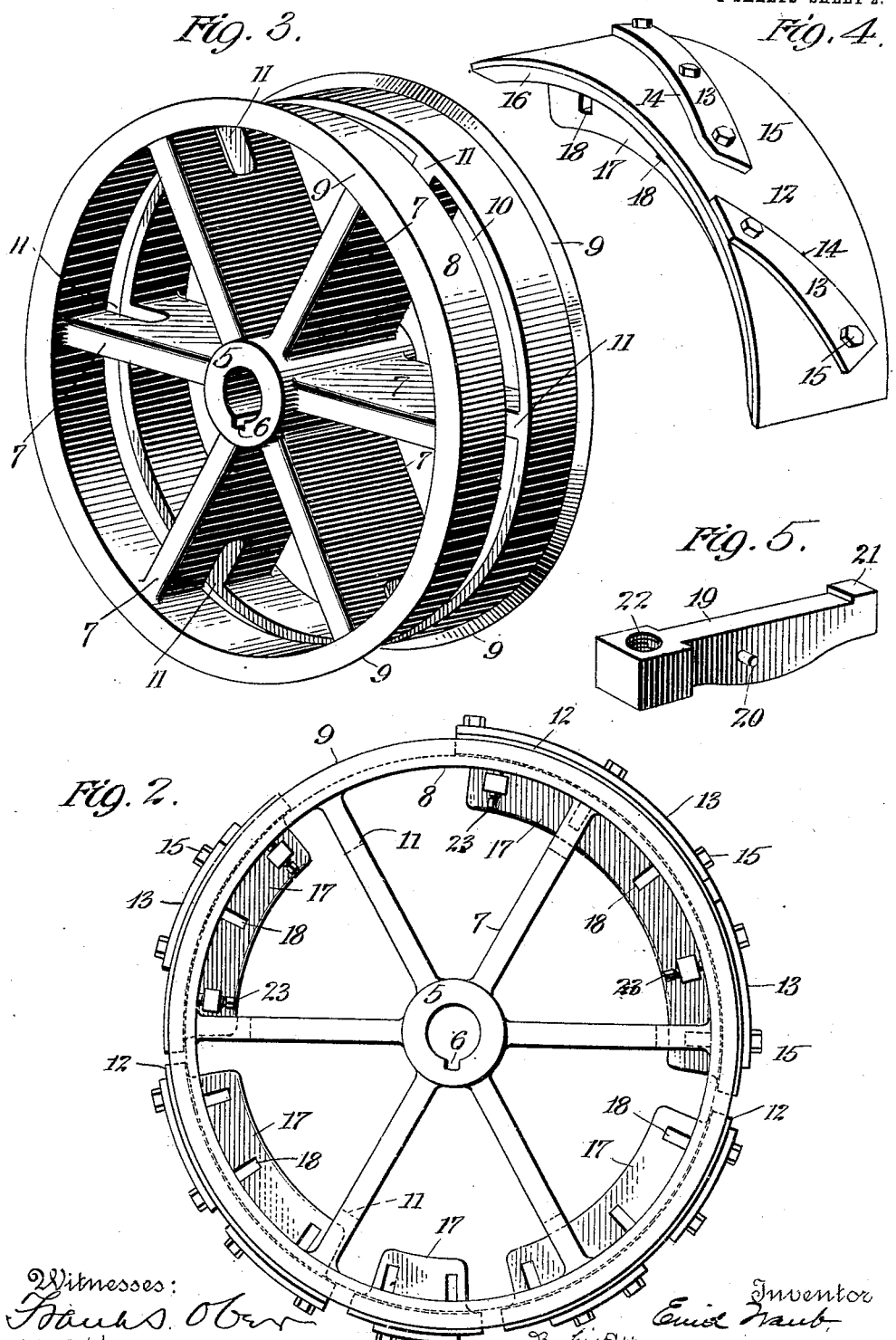

UNITED STATES PATENT OFFICE.

EMIL TRAUB, OF NEWARK, NEW JERSEY, ASSIGNOR TO THE SINGER MANUFACTURING COMPANY, A CORPORATION OF NEW JERSEY.

CAM MECHANISM.

977,488.        Specification of Letters Patent.        Patented Dec. 6, 1910.

Application filed December 3, 1907. Serial No. 404,887.

*To all whom it may concern:*

Be it known that I, EMIL TRAUB, a citizen of the United States, residing at Newark, in the county of Essex and State of New Jersey, have invented certain new and useful Improvements in Cam Mechanisms, of which the following is a specification, reference being had therein to the accompanying drawings.

This invention is designed for embodiment more particularly in screw machines, but is adapted for use in connection with various machines requiring a change in the cams to adapt them for a variety of work.

The invention has for its object to provide a cam member wherein the operative portions are both readily removable and adjustable, in order that a single machine may be provided with a set of interchangeable cam-pieces adapted for producing the different required movements upon the part or parts to be actuated by said cam.

In the preferred form of the improvement, the cam member comprises a drum having annular guide-flanges affording guiding shoulders around its edges and an intermediate annular slot dividing its face into two separate cylindrical portions, and between such guide-flanges are fitted one or more segmental cam-pieces each bearing in permanent relation therewith one or more cam portions adapted to engage the follower connected with the movable part of the machine to be actuated, each cam-piece having upon its inner face a tongue provided with one or more apertures and adapted to enter the annular slot of the holding drum to which it is adjustably secured by means of one or more gibs entering its aperture or apertures and engaging the inner surface of the drum.

In the accompanying drawings, Figure 1 is a side elevation of a portion of a screw machine embodying the present improvement. Fig. 2 is an edge view of the cam detached from the machine, and Figs. 3, 4 and 5 are perspective views, respectively, of the holding drum, one of the cam-pieces and one of the gibs for securing the cam-piece in position.

The machine is constructed with the frame 1, in which is journaled the longitudinal cam-shaft 2 driven, as represented in dotted lines in Fig. 1, by means of a worm-wheel 3 and worm 4. Fixed upon the cam-shaft is a holding drum or pulley which is shown constructed with the hub 5 having the keyway 6 and the broad radial spokes 7 engaging the hub with the rim 8 which is shown provided at the edges with the annular ribs or flanges 9 beveled inwardly to form inclined seats or shoulders to receive the edges of the cam-pieces. Intermediate the flanges 9 the rim is provided with an annular slot 10, and the spokes are formed with registering notches 11.

The cam sections or pieces 12, of which five are shown in Fig. 2, are each of segmental form with their outer cylindrical faces having a curvature concentric with the rim of the holding drum, and upon their exterior faces are provided with one or more strips 13 whose edges present cam portions or shoulders 14 for engagement with the follower, such strips being permanently located and secured to the face of the cam-piece 12 by means of bolts 15 passing through them and tapped into the cam section or piece.

As represented in Fig. 4, the uppermost cam-strip 13 has the most gradual inclination in relation to the edge of the cam-piece, and is designed to give the forward or operative movement to the follower, while the other cam-strip 13, serving to return the follower, is disposed at a more abrupt angle to the direction of motion. The edges of the cam-piece are beveled inwardly at 16 upon the under side to fit the adjacent faces of the flanges 9 of the drum 8, and intermediate such edges is disposed a radially projecting tongue 17 adapted to enter the slot 10 in the pulley rim and notches 11 in the spokes, and this tongue is provided in practice with several radial transverse apertures 18.

To secure the cam-piece upon the holding drum with its beveled edges firmly seated upon the inclined shoulders afforded by the flanges 9 of the drum, gibs 19 are passed through the holes 18 within the pulley rim. Each of these gibs is provided with a lateral stop-pin 20 adapted to engage the face of the tongue 17 to insure its location at the proper locking point, and it is provided upon one end with a projecting portion 21 to engage the inner periphery of the pulley rim 8 and at the opposite end with an enlargement having a threaded aperture 22 to receive the clamp-screw 23 whose point projects from the same side as the projection 21 and similarly engages the inner surface of the rim 8, while the opposite edge of the gib seats itself upon the inner end of the aperture 18. The degree of engagement of the gib with the pulley is determined by the force with which the screw engages the pulley rim, as is obvious.

Referring to Fig. 1, the machine is shown provided with a follower consisting of a cylindrical roller 24 carried by a stud 25 fixed upon the reciprocating carriage 26 fitted to suitable ways in the frame and carrying the rotary tool-holding turret 27. To insure against overthrow the carriage is provided with a depending lug 28 in which is movably mounted the stop-rod 29 which is secured adjustably in position by means of the set-screw 30.

As will be readily understood, when it is desired to convert a machine having the cam fitted for operation upon one piece of work so that its tool-holder will receive the requisite movements for a different piece of work, it is merely necessary to loosen the clamping screws 23, remove the gibs and detach each of the cam-pieces to be replaced and to insert by reciprocal operations the requisite cam-pieces, reserving the removed cam-pieces for use whenever the machine is to be operated for the same class of work.

It will be observed that by the present improvement a series of machines of the class described in a given shop may be provided with cam-drums of the character referred to, so that the cam-pieces of a set are interchangeable not only in connection with any individual machine, but with any machine of the entire system.

Heretofore it has been the practice to build machines of this description with smooth faced cam-drums and to bolt thereon the requisite cam-strips 13 suitable for a given operation of the machine. When it was desired to fit the machine for producing a different movement of the part to be moved, the original cam-strips were removed and others were fitted to the face of the drum by either making new holes therein for the fastening screws 15 or else utilizing the old holes as far as possible and making holes to correspond in the cam-strips, either of which operations was difficult to perform by reason of the inaccessibility of the cam among the other parts of the machine, while the cam-strips were liable to be inaccurately located as well, owing to the difficulties connected with the operation. By the method of construction herein described, the cam-pieces 12, being in sections, may be constructed separately from the machine and the strips 13 applied thereto in the proper positions, while the cam-pieces may, when applied to the drum, be shifted circularly thereon so as to assume the exact position required before the tightening of the clamping screws 23.

Having thus set forth the nature of the invention, what I claim herein is:—

1. A cam-wheel comprising a holding drum provided with a rim having flaring annular peripheral seats, a segmental cam-section fitted to said seats and provided upon its outer face with a cam portion, and means applied to the inner face of said cam-section and including a cross member adapted to engage the inner face of said rim for maintaining said cam-section firmly but adjustably seated upon the rim of said drum.

2. A cam-wheel comprising a holding drum provided with a rim having flaring annular peripheral seats, and an intermediate annular slot, a segmental cam-section fitted to said flaring seats and provided upon its outer face with a cam portion, and fastening means connected with the inner side of the cam section passing through said annular slot and engaging the inner face of the rim at opposite sides of said slot whereby said cam-section is maintained adjustably seated upon the rim of the drum.

3. A cam-wheel comprising a holding drum provided with a cylindrical rim having flaring annular seats upon its outer periphery and an intermediate annular slot, a segmental cam-section having its edges fitted to said flared annular seats and provided upon its outer face with a cam portion, and upon its inner surface with a tongue entering the annular slot in the rim of said drum, and means applied to said tongue for maintaining said cam-section firmly but adjustably seated upon the rim of said drum.

4. A cam-member comprising a holding drum provided with a cylindrical rim having peripheral seats and an intermediate annular slot, a segmental cam-section fitted to said seats and provided with a cam-portion on its outer face and with a tongue formed with a transverse aperture and entering the annular slot in the rim of said drum, and a gib inserted in said aperture in the tongue and adapted to bear at one end upon the inner surface of the rim and provided at its opposite end with a clamping screw engaging said rim.

5. A cam-member comprising a holding drum formed with a rim having an annular slot, a segmental cam-section provided upon its outer face with a cam-portion and upon its inner face with a radial tongue having transverse apertures, and gibs applied to said apertures and engaging the inner surface of the rim of said drum for securing
5 said cam-section adjustably upon said holding drum.

In testimony whereof, I have signed my name to this specification, in the presence of two subscribing witnesses.

EMIL TRAUB.

Witnesses:
 JOSEPH F. JAQUITH,
 HENRY J. MILLER.